United States Patent
Gruenthaner

(10) Patent No.: US 11,938,663 B2
(45) Date of Patent: Mar. 26, 2024

(54) METHOD FOR MANUFACTURING A MOLDED PART

(71) Applicant: NOVEM CAR INTERIOR DESIGN GMBH, Vorbach (DE)

(72) Inventor: Michael Gruenthaner, Creussen (DE)

(73) Assignee: NOVEM CAR INTERIOR DESIGN GMBH, Vorbach (DE)

( * ) Notice: Subject to any disclaimer, the term of this patent is extended or adjusted under 35 U.S.C. 154(b) by 520 days.

(21) Appl. No.: 16/675,111

(22) Filed: Nov. 5, 2019

(65) Prior Publication Data

US 2020/0139600 A1 May 7, 2020

(30) Foreign Application Priority Data

Nov. 6, 2018 (DE) ...................... 10 2018 127 648.6

(51) Int. Cl.
| | |
|---|---|
| *B29C 45/14* | (2006.01) |
| *B29C 45/00* | (2006.01) |
| *B32B 5/02* | (2006.01) |
| *B32B 21/08* | (2006.01) |
| *B32B 21/10* | (2006.01) |
| *B32B 21/14* | (2006.01) |
| *B29K 711/14* | (2006.01) |

(52) U.S. Cl.
CPC .... *B29C 45/14811* (2013.01); *B29C 45/0053* (2013.01); *B32B 5/022* (2013.01); *B32B 21/08* (2013.01); *B32B 21/10* (2013.01); *B32B 21/14* (2013.01); *B29C 2045/0079* (2013.01); *B29K 2711/14* (2013.01); *B32B 2274/00* (2013.01)

(58) Field of Classification Search
None
See application file for complete search history.

(56) References Cited

U.S. PATENT DOCUMENTS

| | | | |
|---|---|---|---|
| 3,989,890 A | 11/1976 | Nathanson et al. | |
| 2002/0031620 A1* | 3/2002 | Yuzawa | B44C 5/0453 |
| | | | 362/362 |

(Continued)

FOREIGN PATENT DOCUMENTS

| | | |
|---|---|---|
| CN | 103862620 A | 6/2014 |
| CN | 104175377 A | 12/2014 |

(Continued)

OTHER PUBLICATIONS

Machine English translation of DE2511982A, Accessed Feb. 14, 2023 (Year: 1976).*

*Primary Examiner* — Jacob T Minskey
*Assistant Examiner* — Adrianna N Konvas
(74) *Attorney, Agent, or Firm* — Workman Nydegger

(57) ABSTRACT

The invention relates to a method for manufacturing a molded part, comprising the steps of providing a wood veneer that is intended for forming the decorative layer, applying lacquer, in particular a synthetic material lacquer, to the front side of the wood veneer, the lacquer being applied to some sections of the front side of the wood veneer according to an intended pattern or symbol, back-injecting the wood veneer on the rear side of the wood veneer with a backing material, in particular an acrylonitrile butadiene styrene (ABS) copolymer synthetic material, for forming the backing, pickling the wood veneer on the front side of the wood veneer, in particular with a water-soluble pickling agent.

19 Claims, 2 Drawing Sheets

(56) References Cited

U.S. PATENT DOCUMENTS

2012/0015107 A1\* 1/2012 Schacht .................. B05D 7/06
 427/261
2014/0349102 A1 11/2014 Piccin et al.

FOREIGN PATENT DOCUMENTS

| | | |
|---|---|---|
| CN | 206217790 U | 6/2017 |
| DE | 2511982 A \* | 9/1976 |
| DE | 2537239 A1 | 3/1977 |
| DE | 102004062646 A1 | 6/2006 |
| DE | 102012003778 A1 | 8/2013 |
| DE | 102015005591 A1 | 11/2016 |
| DE | 102018002709 A1 | 9/2018 |
| FR | 2261620 A1 | 9/1975 |
| JP | 2001-341106 A | 12/2001 |

\* cited by examiner

METHOD FOR MANUFACTURING A MOLDED PART

CROSS-REFERENCE TO RELATED APPLICATIONS

The present invention claims the benefit of priority from German Patent Application No. 10 2018 127 648.6, filed Nov. 6, 2018, the entire content of which is incorporated herein by reference.

BACKGROUND OF THE INVENTION

1. The Field of the Invention

The invention relates to a method for manufacturing a molded part, in particular a decorative part and/or trim part for a vehicle interior designed as a molded part.

2. Background and Relevant Art

Numerous decorative parts and trim parts are installed in the interior of a vehicle, such as door moldings and console and instrument veneers. Decorative parts and trim parts also include control buttons and/or their covers.

For such molded parts, there is a continual need to provide a high-quality decorative visual appearance. In addition, increasingly stringent requirements are imposed on the haptics of such molded parts; in particular, they should ensure an interesting and appealing feeling for the user when touched.

BRIEF SUMMARY OF THE INVENTION

The object of the invention, therefore, is to provide a novel method for manufacturing a molded part, in particular a method with which a molded part having particularly appealing haptics may be manufactured.

This object is achieved by the features of Claim 1. Advantageous embodiments and refinements are set forth in the respective dependent claims.

The method according to the invention is provided for manufacturing a molded part, in particular a decorative part and/or trim part for a vehicle interior designed as a molded part, wherein the molded part comprises a wood veneer designed as a decorative layer and a backing, the wood veneer having a front side provided as the visible side and a rear side opposite from the front side.

The method according to the invention comprises the steps: providing a wood veneer that is intended for forming the decorative layer, applying lacquer, in particular a synthetic material lacquer, to the front side of the wood veneer, the lacquer being applied to some sections of the front side of the wood veneer according to an intended pattern or symbol, back-injecting the wood veneer on the rear side of the wood veneer with a backing material, in particular a synthetic material, preferably acrylonitrile butadiene styrene (ABS) copolymer synthetic material, for forming the backing, pickling the wood veneer on the front side of the wood veneer, in particular with a water-soluble pickling agent. The pickling may take place before or after the back-injection.

The advantages of the invention are that a three-dimensional relief structure is created on the front side of the decorative layer, so that inflexible, costly pressing tools or embossing tools may be dispensed with.

Another advantage of the invention is that by use of the method according to the invention, a molded part is produced having haptics in which a smooth surface can be felt in some sections, and the grain structure of the wood veneer can be felt in some sections. In addition, with the method according to the invention a molded part may be manufactured which allows a visual appearance having two different colors on the front side of the wood veneer designed as the visible side.

The terms "symbol" and "pattern" are to be construed broadly. The symbol may involve, for example, one or more function symbols and/or decorative elements such as lines. In addition, the symbol may involve, for example, one or more letters or a logo or a motif. The pattern may involve, for example, geometric patterns or shapes.

According to one particularly preferred embodiment of the invention, it is provided that the front side of the wood veneer is impregnated in some sections by means of the lacquer in the areas of the lacquer application, and/or that the pickling of the wood veneer results in partial swelling of the wood veneer in the areas in which no lacquer is applied, so that a three-dimensional relief structure corresponding to the symbol or pattern is formed on the front side of the wood veneer.

Furthermore, it may be provided that the lacquer has a first color and/or is transparent or translucent, and in the pickled area the wood veneer has a second color, in particular due to changing the color of the front side of the wood veneer by means of the pickling.

The lacquer is preferably applied to the front side of the wood veneer by means of a screen printing process, the lacquer being applied in particular as a glaze or a blanket.

For example, the pickling agent is sprayed onto the front side of the wood veneer in a spraying process, in particular by means of a spray gun.

The pickled wood veneer is preferably dried for a specified drying period.

According to one embodiment variant of the invention, a protective and/or optical layer, in particular a protective lacquer, preferably a synthetic resin spray lacquer or a PUR high-gloss layer in a plastic casting process, is applied to the front side of the wood veneer and to the lacquer in the areas of the lacquer application, in particular after drying of the pickled wood veneer.

It may be provided that the wood veneer is calibrated and/or laminated with a backing fleece, preferably by means of adhesive, before the wood veneer is back-injected with the backing material for forming the backing.

Moreover, it may be provided that the wood veneer is preformed before it is back-injected with the backing material for forming the backing, and in particular after it is laminated with the backing fleece.

One refinement of the invention provides that the wood veneer is cut to size according to a specified shape before it is back-injected with the backing material for forming the backing, and in particular before it is preformed.

After the back-injection, the wood veneer that is back-injected with the backing material is preferably milled, in particular on the front side of the wood veneer.

The method according to the invention is explained in greater detail below with regard to further features and advantages, based on the description of one exemplary embodiment of the method and with reference to the appended schematic drawings.

DETAILED DESCRIPTION OF THE PREFERRED EMBODIMENTS

Figure 1:
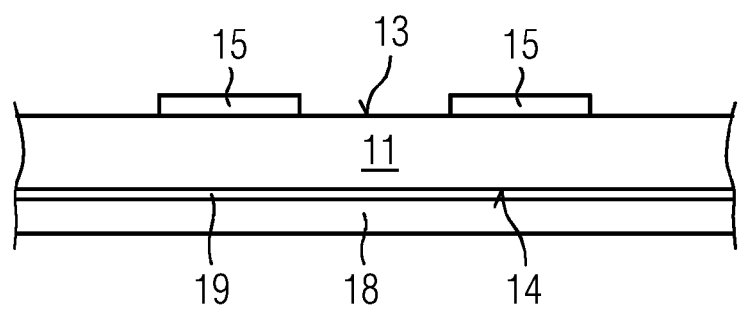
FIGS. 1 and 2 each show a schematic cross-sectional illustration of one exemplary embodiment of the molded part to be manufactured with the method according to the invention, in different stages during the manufacturing process.

The method according to the invention is provided for manufacturing a molded part 10 which comprises a wood veneer 11, provided as a decorative layer, and a backing 12, the wood veneer 11 having a front side 13 designed as the visible side and a rear side 14 opposite from the front side 13.

First, a wood veneer 11 intended for forming the decorative layer is provided. The wood veneer 11 is then calibrated and laminated with a backing fleece 18 by means of adhesive 19.

As illustrated in FIG. 1, lacquer 15, in particular a synthetic material lacquer, is subsequently applied to the front side of the wood veneer 11, the lacquer 15 being applied to some sections of the front side 13 of the wood veneer 11 according to an intended pattern or symbol, and the front side 13 of the wood veneer 11 being impregnated in some sections by means of the lacquer 15 in the areas of the lacquer application. The lacquer 15 is applied by means of a screen printing process as a glaze or a blanket.

In a subsequent step, the wood veneer 11 is cut to size according to an intended shape and then preformed.

The wood veneer 11 is back-injected on the rear side 14 of the wood veneer with a backing material, in particular an acrylonitrile butadiene styrene (ABS) copolymer synthetic material, for forming the backing 12.

After the back-injection, the wood veneer 11 that is back-injected with the backing material is milled on the front side 13 of the wood veneer.

In a further step, the wood veneer 11 is pickled on its front side 13 with a water-soluble pickling agent, the pickling agent being sprayed onto the front side 13 of the wood veneer 11 in a spraying process by means of a spray gun. The pickled wood veneer 11 is subsequently dried for a specified drying period.

Figure 2:
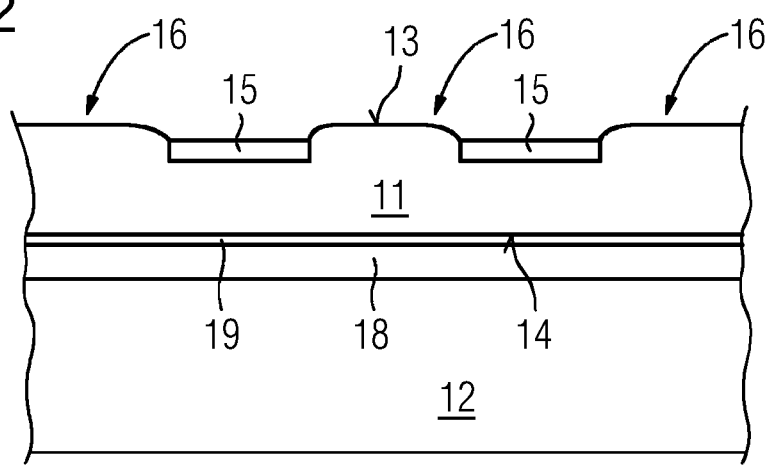

The pickling of the wood veneer 11 results in partial swelling of the wood veneer 11 in the areas 16 in which no lacquer 15 is applied, since these areas are impregnated by the lacquer, so that on the front side 13 of the wood veneer 11, a three-dimensional relief structure corresponding to the symbol or pattern is formed by the wood veneer 11, as illustrated in FIG. 2.

The lacquer 15 has a first color and may be transparent. The pickled area 16 has a second color due to changing the color of the front side 13 of the wood veneer 11 by means of the pickling, resulting in a particularly attractive appearance of the decorative layer formed by the wood veneer 11.

Figure 3A:
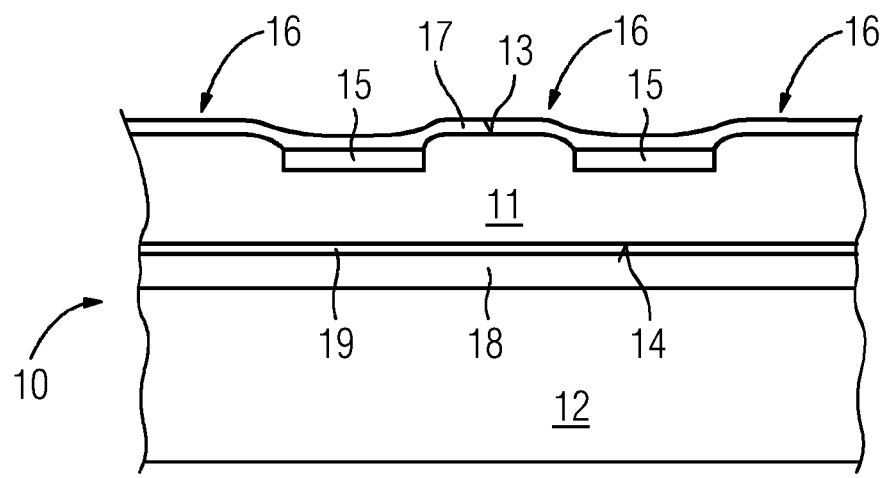
FIGS. 3a and 3b each show one exemplary embodiment of a molded part that is manufactured according to the method according to the invention.

After the drying of the pickled wood veneer 11, a synthetic resin spray lacquer provided as a protective and/or optical layer 17 is applied to the front side 13 of the wood veneer 11 and to the lacquer 15 in the areas of the lacquer application. A molded part 10 that is manufactured with the above-mentioned method according to the invention is illustrated in FIG. 3a.

Figure 3B:
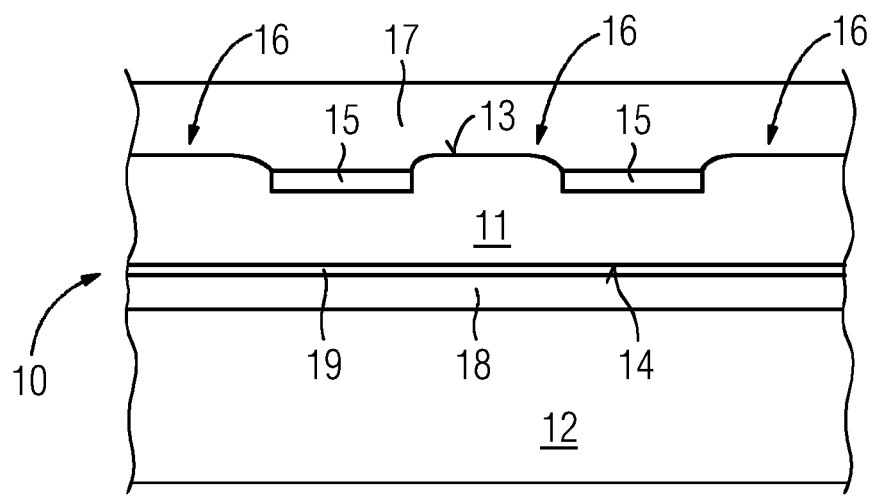

Alternatively, after the drying of the pickled wood veneer 11, a PUR high-gloss layer provided as a protective and/or optical layer 17 may be cast onto the front side 13 of the wood veneer 11 and onto the lacquer 15 in the areas of the lacquer application. A molded part 10 that is manufactured with the above-mentioned method according to the invention is illustrated in FIG. 3b.

LIST OF REFERENCE NUMERALS 10 molded part
11 decorative layer
12 backing
13 front side
14 rear side
15 lacquer
16 area
17 protective and/or optical layer
18 backing fleece
19 adhesive

I claim:

1. A method for manufacturing a molded part, wherein the molded part comprises a wood veneer designed as a decorative layer and a backing, the wood veneer having a front side provided as the visible side and a rear side opposite from the front side, the method comprising:
   providing a wood veneer that is intended for forming the decorative layer;
   applying lacquer to the front side of the wood veneer, the lacquer being applied only to some sections of the front side of the wood veneer according to an intended pattern or symbol, wherein the front side of the wood veneer has sections in which lacquer is applied and sections in which no lacquer is applied;
   back-injecting the wood veneer on the rear side of the wood veneer with a backing material for forming the backing; and
   pickling the wood veneer on all sections of the front side of the wood veneer, wherein,
   in the areas of the lacquer application, the front side of the wood veneer is impregnated with the lacquer, and is unaffected by the pickling; and
   the pickling of the wood veneer in the sections in which no lacquer is applied results in partial swelling of the wood veneer, so that a three-dimensional relief structure corresponding to the symbol or pattern is formed on the front side of the wood veneer.

2. The method according to claim 1, wherein:
   the lacquer has a first color and/or is transparent or translucent; and,
   in the pickled area, the wood veneer has a second color.

3. The method according to claim 1, wherein:
   the lacquer is applied to the front side of the wood veneer by means of a screen printing process.

4. The method according to claim 1, wherein:
   the pickling agent is sprayed onto the front side of the wood veneer in a spraying process.

5. The method according to claim 1, wherein:
   the pickled wood veneer is dried for a specified drying period.

6. The method according to claim 1, wherein:
   a protective and/or optical layer is applied to the front side of the wood veneer and to the lacquer in the areas of the lacquer application.

7. The method according to claim 1, wherein:
   the wood veneer is calibrated and/or laminated with a backing fleece before the wood veneer is back-injected with the backing material for forming the backing.

8. The method according to claim 1, wherein:
   the wood veneer is preformed before it is back-injected with the backing material for forming the backing.

9. The method according to claim 1, wherein:
the wood veneer is cut to size according to a specified shape before it is back-injected with the backing material for forming the backing.

10. The method according to claim 1, wherein:
after the back-injection, the wood veneer that is back-injected with the backing material is milled.

11. The method according to claim 1, wherein:
the sections to which the lacquer is applied form a negative image of the intended pattern or symbol, wherein the section of the wood veneer that corresponds to the intended pattern is that in which no lacquer is applied; and
the pickling causes the pattern or symbol to swell and rise up, such that only the pickled portion of the wood veneer is elevated relative to the lacquered section.

12. The method according to claim 1, wherein:
the symbol comprises one or more function symbols, decorative elements, and/or a letter, or a logo, or a motif; and
the pattern comprises a geometric pattern or shape.

13. The method according to claim 1, wherein the pickled portions provide a series of peaks adjacent a series of valleys corresponding to the lacquered areas.

14. The method according to claim 13, further comprising:
applying a protective and/or optical layer over both the series of peaks and series of valleys, such that the series of valleys are at least partially filled in by the protective and/or optical layer.

15. The method according to claim 14, wherein:
the valleys are completely filled in by the protective and/or optical layer; and
the protective and/or optical layer provides a planar surface over the molded part.

16. The method according to claim 14, wherein:
the valleys are only partly filled in by the protective and/or optical layer; and
the molded part retains a relief surface on the protective and/or optical layer that corresponds to, but is less pronounced than, the relief surface formed on the wood veneer by the pickled portions and lacquered portions.

17. The method according to claim 1, wherein:
the three-dimensional relief structure is formed without removal of any material from the molded part.

18. The method according to claim 1, wherein:
the pickled portion of the wood veneer is out of plane with the lacquered portion thereof.

19. The method according to claim 1, further comprising:
milling the front side of the wood veneer in advance of applying the pickling.

* * * * *